United States Patent [19]

Treybig

[11] Patent Number: 4,629,770

[45] Date of Patent: Dec. 16, 1986

[54] THERMOSETTABLE POLYSTYRYLPYRAZINE POLYMERS TERMINATED WITH ETHYLENICALLY UNSATURATED GROUPS AND CURED PRODUCTS THEREFROM

[75] Inventor: Duane S. Treybig, Lake Jackson, Tex.

[73] Assignee: The Dow Chemical Company, Midland, Mich.

[21] Appl. No.: 726,555

[22] Filed: Apr. 23, 1985

[51] Int. Cl.$^4$ .............................................. C08L 61/34
[52] U.S. Cl. ..................................... 525/517; 524/542; 524/597; 525/519; 525/923; 528/245; 528/246; 528/252
[58] Field of Search ....................... 528/246, 252, 245; 525/517, 923

[56] References Cited

U.S. PATENT DOCUMENTS

| | | | |
|---|---|---|---|
| 3,562,223 | 2/1971 | Bargain et al. | 260/78 |
| 3,994,862 | 11/1976 | Ropars et al. | 260/67.5 |
| 4,163,740 | 8/1979 | Malassine et al. | 260/31.2 N |
| 4,362,860 | 12/1982 | Ratto et al. | 528/248 |
| 4,500,690 | 2/1985 | La Tulip | 528/245 X |

FOREIGN PATENT DOCUMENTS 45-1265  1/1970  Japan .

OTHER PUBLICATIONS

"Effect of 2,5-Dimethylpyrazine on Aldehydes", Berichte der Deutschen Chemischen Gesellschaft, vol. 38, No. 3 (1905), pp. 3724–3728 by R. Franke.
"Poly-2,5-Distyrylpyrazine and its Properties", Journal of Polymer Science: Part A-1, vol. 7, pp. 2037–2049 (1969) by Fuyishige and Hasegawa.
"Solid State Photopolymerization", Kozyo Gitjutsuin Sen'l Kozyo Shikensho Kenkyu Habaku, Yokahawa, Japan, 1969, No. 86, pp. 1–12 by Hasegawa, Masaki.
"Structure and Properties of Poly-2,5-Distyrylpyrazine", J. Polymer Sci., Part A-2, 1970, No. 8, pp. 1027–1037.
"Characterization of Cured Polystyrylpyridine by Model Compounds", Journal of Applied Polymer Science, vol. 26, pp. 1975–1987 (1981) by Hsu, Rosenberg, Parker and Heimbuch.
"Four-Center Type Photopolymerization in Solid State", by Masaki Hasegawa in Polymer Chem., vol. 27, No. 302, pp. 337–349 (1970).
Mustafa and Hilmy, J. Chem. Soc., 1947, pp. 1698–1699.
Shaw, J. Chem. Soc., 1924, pp. 2363–2365.
Shaw and Wagstaff, J. Chem. Soc., 1933, pp. 77–79.
"Four-Center Type Photopolymerization in the Solid State. I. Polymerzation of 2,5-Distyrylpyrazine and Related Compounds", by Hasegawa, Suzuki, Suzuki and Nakanishi in J. Polymer Sci., Part A-1, vol. 7, pp. 743–752.
"On α-Styrylpyridine", H. Baurath, Ber., 20, 1887, pp. 2719–2720.
"Condensation of α- and Y-Methylpyridine Derivatives with Cinnamaldehyde", by Späth, Kubiczek and Dubensky, Ber., 74B, pp. 873–879 (1941).
"On the Condensation of α:Y:α'-Trimethylpyridine with Benzaldehyde", by Konigs and Bentheim, Ber., 38, pp. 3907–3911 (1905).
A dissertation, "Stereochemistry of Styrylpyridine Photodimers", by Stephen Edward Burkle, University of New Hampshire, 1973.

Primary Examiner—Theodore E. Pertilla
Attorney, Agent, or Firm—J. G. Carter

[57] ABSTRACT

Thermosettable prepolymers or resins are prepared by reacting (1) a pyrazine compound containing at least two substituent groups which have a hydrogen atom attached to a carbon atom which is attached to the ring such as tetramethylpyrazine, (2) a material containing at least two aromatic aldehyde groups, and (3) at least one of (a) a nitrogen containing aromatic heterocyclic compound containing at least one hydrogen atom attached to a carbon atom attached to the ring and a polymerizable unsaturated group such as 2-methyl-5-vinylpyridine or (b) an aldehyde containing at least one polymerizable unsaturated group such as 4-isopropenyl-1-cyclohexene-1-carboxaldehyde. These prepolymers or resins are curable to thermoset products having good mechanical and thermal properties by heat and pressure or by homopolymerization or copolymerization with N,N'-bis-imides such as 1,1'-(methylenedi-4,1-phenylene)-bismaleimide. The prepolymers are suitable for preparing composites.

35 Claims, No Drawings

THERMOSETTABLE POLYSTYRYLPYRAZINE POLYMERS TERMINATED WITH ETHYLENICALLY UNSATURATED GROUPS AND CURED PRODUCTS THEREFROM

BACKGROUND OF THE INVENTION

The present invention pertains to polymers prepared from substituted pyrazines containing at least one substituent group having a hydrogen atom attached to a carbon atom attached to the ring, aromatic polyaldehydes and aldehydes or a nitrogen-containing heterocyclic compound containing at least one substituent group having a hydrogen atom attached to a carbon atom attached to the ring and a polymerizable unsaturated group.

A copending application Ser. No. 670,428 entitled "Thermosettable Polymers or Prepolymers Prepared from Polymethylated Pyrazines and Aromatic Polyaldehydes and Cured Products Therefrom" filed Nov. 9, 1984 by Duane S. Treybig and Loren L. Swearingen discloses thermosettable polymers prepared by reacting an alkyl substituted pyrazine with a dialdehyde. The cured prepolymer has excellent properties at elevated temperatures as well as a high char yield (61% to 71%) in nitrogen. These properties of the resin are particularly suitable for the preparation of graphite fiber composites or other cured articles which may be subjected to fire. However, these thermosettable prepolymers are cured by a condensation reaction which generates water. This water vaporizes during cure and produces undesirable voids and/or surface imperfections in the composite or other cured article.

These prepolymers can be terminated with an ethenyl (vinyl) substituted mono-aldehyde or a vinyl and alkyl substituted aromatic heterocyclic compound. The resulting vinyl terminated polystyrylpyrazine prepolymers can then be cured by an addition reaction via the unsaturated terminal groups, thereby eliminating the release of water vapor and resulting in composites or other cured articles which do not possess surface imperfections.

The vinyl terminated polystyrylpyrazine prepolymers of the present invention are also suitable as novel comonomers for reaction with N,N'-bis-imide resins. The copolymerization of the vinyl terminated prepolymers with N,N'-bis-imide resins occurs at a lower cure temperature than that of a maleimide resin alone, which results in energy conservation. Since the copolymerization is an addition reaction, volatile generation is minimized. The copolymers are more amorphous, less brittle, less crystalline and tougher polymers than N,N'-bisimide polymers. Depending upon the choice of the vinyl termination molecule, the char yield of the resultant copolymer is higher than the char yield of the cured N,N'-bis-imide on pyrolysis. As a consequence of the high char yield of these copolymers, they exhibit better fire resistance than the cured N,N'-bis-imides. Char yield is defined herein as the percent by weight of the polymer remaining after exposure to 950° C. during a thermogravimetric analysis of the polymer in a nitrogen atmosphere.

SUMMARY OF THE INVENTION

One aspect of the present invention pertains to a thermosettable product which results from reacting
(A) a pyrazine compound containing at least two substituent groups which have at least one hydrogen atom attached to a carbon atom which is attached to the ring or mixture of such pyrazines;
(B) at least one material having at least two aldehyde groups; and
(C) at least one of
   (1) a nitrogen containing aromatic heterocyclic compound containing at least one hydrogen atom attached to a carbon atom attached to the ring and a polymerizable unsaturated group;
   (2) an aldehyde containing at least one polymerizable unsaturated group; or
   (3) a combination thereof;
and wherein components (A), (B) and (C) are employed in quantities which provide a mole ratio of (B):(C):(A) of from about 0.25:0.25:1 to about 4:4:1, from about 0.5:0.5:1 to about 1.5:1.5:1.

Another aspect of the present invention pertains to a thermosettable product which results from reacting (A) a pyrazole, imidazole, pyridazine, pyrimidine, purine, pteridine, triazine, quinoline or quinoxaline compound or a mixture of any two or more of such compounds containing at least one substituent group which has a hydrogen atom attached to a carbon atom which is attached to the ring with the proviso that at least one of such pyrazole, imidazole, pyridazine, pyrimidine, purine, pteridine, triazine, quinoline or quinoxaline compounds has at least two substituent groups which have a hydrogen atom attached to a carbon atom which is attached to the ring; (B) at least one of (1) at least one material having at least two aldehyde groups or (2) at least one aldehyde having only one aldehyde group; and (C) at least one of (1) a nitrogen containing aromatic heterocyclic compound containing at least one hydrogen atom attached to a carbon atom attached to the ring and a polymerizable unsaturated group; (2) an aldehyde containing at least one polymerizable unsaturated group or (3) a combination thereof; and wherein components (A), (B) and (C) are employed in quantities which provide a molar ratio of components (B):(C):(A): of from about 0.25:0.25:1 to about 4:4:1, preferably from about 0.5:0.5:1 to about 1.5:1.5:1.

Another aspect of the present invention pertains to a thermosettable product which results from reacting (A) a mixture of (1) at least one pyrazine compound having at least one substituent group which has a hydrogen atom attached to a carbon atom which is attached to the ring and (2) at least one of pyrazole, imidazole, pyridazine, pyrimidine, purine, pteridine, triazine, quinoline or quinoxaline compounds having at least two substituent groups which have a hydrogen atom attached to a carbon atom which is attached to the ring; (B) at least one of (1) at least one material having at least two aldehyde groups or (2) at least one aldehyde having only one aldehyde group; and (C) at least one of (1) a nitrogen containing aromatic heterocyclic compound containing at least one hydrogen atom attached to a carbon atom attached to the ring and a polymerizable unsaturated group; (2) an aldehyde containing at least one polymerizable unsaturated group or (3) a combination thereof; and wherein components (A), (B) and (C) are employed in quantities which provide a molar ratio of components (B):(C):(A): of from about 0.25:0.25:1 to about 4:4:1, preferably from about 0.5:0.5:1 to about 1.5:1.5:1.

Another aspect of the present invention pertains to a thermosettable product which results from reacting (A) a mixture of pyrazine and pyridine each having at least one substituent group which has a hydrogen atom attached to a carbon atom which is attached to the ring to act as a chain terminator, with the proviso that the majority of such pyrazine or pyridine compounds have at least two substituent groups which have a hydrogen atom attached to a carbon atom which is attached to the ring with (B) at least one of (1) at least one material having at least two aldehyde groups or (2) a mixture of (a) at least one aldehyde having at least two aldehyde groups and (b) at least one aldehyde having only one aldehyde group; and (C) at least one of (1) a nitrogen containing aromatic heterocyclic compound containing at least one hydrogen atom attached to a carbon atom attached to the ring and a polymerizable unsaturated group; (2) an aldehyde containing at least one polymerizable unsaturated group or (3) a combination thereof; and wherein components (A), (B) and (C) are employed in quantities which provide a molar ratio of components (B):(C):(A): of from about 0.25:0.25:1 to about 4:4:1, preferably from about 0.5:0.5:1 to about 1.5:1.5:1.

Another aspect of the present invention pertains to the products resulting from curing the aforementioned thermosettable reaction product by heat and pressure or by homopolymerization in the presence of N,N'-bis-imides or copolymerization with a N,N'-bis-imide.

Another aspect of the present invention pertains to the composition resulting from reacting (A) a nitrogen containing aromatic heterocyclic compound containing at least one hydrogen atom attached to a carbon atom which is attached to the ring with (B) 4-isopropenyl-1-cyclohexene-1-carboxaldehyde. These materials are useful herein as terminating agents.

DETAILED DESCRIPTION OF THE PREFERRED INVENTION

Suitable pyrazines which can be employed herein include any pyrazine which has at least two substituent groups which have at least one hydrogen atom attached to a carbon atom which is attached to the ring. Particularly suitable pyrazines include, di-, tri- and tetraalkyl pyrazines such as, for example, 2,5-dimethylpyrazine, 2,6-dimethylpyrazine, 2,3-dimethylpyrazine, 3,5-dimethyl-2,6-pyrazinediamine, 2,3,5-trimethylpyrazine, 2,3,5-trimethyl-6-pyrazinonitrile, 2-chloro-3,5,6-trimethylpyrazine, 2,3,5,6-tetramethylpyrazine, 2,5-diethylpyrazine, 2,5-dipropylpyrazine, 2,6-diethylpyrazine, 2,6-dipropylpyrazine, 2,3-diethylpyrazine, 2,3-dipropylpyrazine, 2,3,5-triethylpyrazine, 2,3,5-tripropylpyrazine, mixtures thereof and the like. 2-Methylpyrazine can be mixed or blended with pyrazine having two or more methyl groups to control the molecular weight of the prepolymer.

Other aromatic nitrogen containing heterocyclic compounds such as pyrazole, pyridazine, pyrimidines, purines, pteridines, imidazole, triazines, quinoline and quinoxalines having two or more substituents which have at least one hydrogen atom attached to a carbon atom which is attached to the ring can be mixed with or substituted for the pyrazines having such substituents. Suitable pyrazoles include 3,5-dimethylpyrazole, 1-ethyl-3,5-dimethylpyrazole and 3,4,5-trimethylpyrazole. Suitable pyridazines include 3,5-dimethylpyridazine, 4-chloro-3,5-dimethylpyridazine and 3,4,5-trimethylpyridazine. Suitable pyrimidines include 2,4-dimethylpyrimidine, 4,5-dimethylpyrimidine, 4,6-dimethylpyrimidine, 2,6-dimethyl-4-pyrimidinamine and 2,4,6-trimethylpyrimidine. Suitable purines include 2,8-dimethylpurine, 2,8-dimethyl-6-purinamine, and 2,6,8-trimethylpurine. Suitable pteridines include 6,7-dimethylpteridine, 2,6-dimethylpteridine, 2,4,7-trimethylpteridine, and 2,4,6,7-tetramethylpteridine. Suitable imidazoles include 2,5-dimethylimidazole, 2,4-dimethylimidazole and 2,4,5-trimethylimidazole. Suitable triazines include 3,5-dimethyl-1,2,4-triazine, 3,6-dimethyl-1,2,4-triazine, 2,6-dimethyl-1,3,5-triazine and 2,4,6-trimethyl-1,3,5-triazine. Suitable quinolines include 2,6-dimethylquinoline, 2,7-dimethylquinoline, 2,4-dimethylquinoline, 2,3,6-trimethylquinoline and 2,3,6,7-tetramethylquinoline. Suitable quinoxalines include 2,5-dimethylquinoxaline, 2,3-dimethylquinoxaline, 2,6-dimethylquinoxaline, 2,3,7-trimethylquinoxaline and 2,3,6,8-tetramethylquinoxaline. Pyrazole, pyridazine, pyrimidine, purines, pteridines, imidazoles, triazines, quinolines and quinoxalines having two or more of such substituents can be mixed or blended with each other or pyrazine having two or more of such substituents. Also, pyridine having two or more of such substituents can be mixed or blended with pyrazine, pyrazole, pyridazine, pyrimidine, purines, pteridines, imidazoles, triazines, quinolines or quinoxalines having two or more of such substituents or their mixtures.

Molecular weight control of the polymer can be obtained by the addition of an aromatic nitrogen containing heterocyclic compound having one substituent which has only one hydrogen atom attached to a carbon atom which is attached to the ring as a chain terminator to an aromatic nitrogen containing heterocyclic compound having two or more substituents which have at least one hydrogen atom attached to a carbon atom which is attached to the ring. For example, pyrazine, pyridine, pyrazole, pyridazine, pyrimidine, purines, pteridines, imidazoles, triazines, quinolines, quinoxalines or a mixture of any two or more such compounds having at least one such substituent can be blended or mixed with those having more than one such substituent.

Suitable aldehydes which can be employed herein include any aldehydes which contain at least two aldehyde groups and no other substituent groups which would tend to interfere with the reaction of the aldehyde groups and the said substituent groups of the pyrazine material. Particularly suitable aldehyde materials include, for example, those of the formula:

wherein n=2 or more, and R is an aromatic group such as, for example,

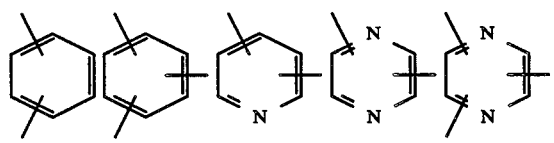

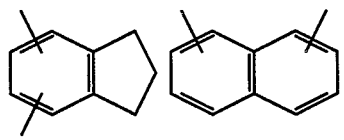

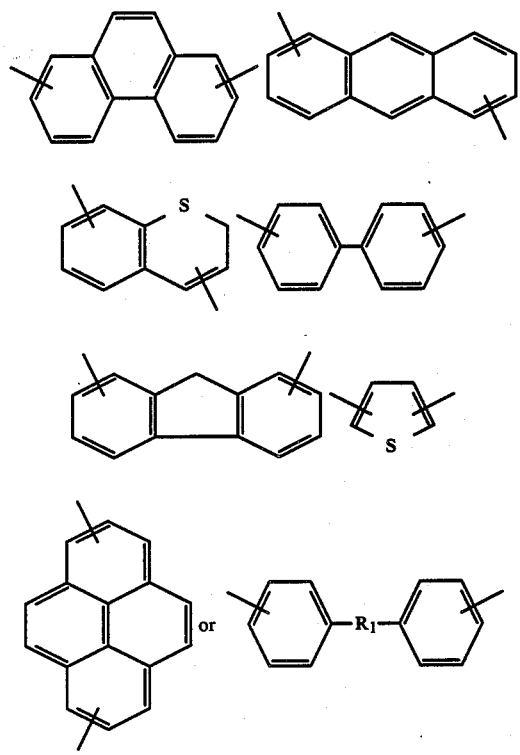

wherein $R_1$ is alkylene, oxygen, sulfur, oxyalkylene, polyoxyalkylene,

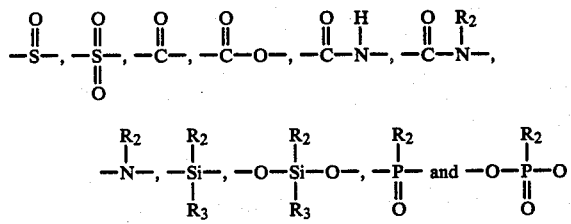

wherein $R_2$ and $R_3$ are alkyl, aryl or aralkyl, and substituted groups thereof.

Particularly suitable aldehydes include, for example, terephthaldicarboxaldehyde, o-phthalicdicarboxaldehyde, isophthalaldehyde, glyoxal, dicinnamylaldehyde, 2,5-pyrazinedicarboxaldehyde, 2,3,4,5-pyrazinetetracarboxaldehyde, 1,5-naphthalenedicarboxaldehyde, 1,2,4,5,7,8-naphthalenehexacarboxaldehyde, 1-bromo-2,5-naphthalenedicarboxaldehyde, 2-hydroxy-1,5-naphthalenedicarboxaldehyde, 2,6-phenanthrenedicarboxaldehyde, 2,7-pyrenedicarboxaldehyde, 4-chloro-2H-thiochromene-3,7-dicarboxaldehyde, 2,6-fluorenedicarboxaldehyde, 10-chloro-3,8-anthracenedicarboxaldehyde, 3,7-quinolinedicarboxaldehyde, 4,4'-bisbenzene-1-carboxaldehyde, 4,4'-oxy-bisbenzene-1-carboxaldehyde, 4,4'-(2,1-ethanediylbisoxy)-benzene-1-carboxaldehyde, 4,4'-sulfonylbisbenzene-1-carboxaldehyde, 4,4'-methylenebisbenzene-1-carboxaldehyde, and mixtures thereof.

Monoaldehydes such as benzaldehyde, o-tolualdehyde, trans-cinnamaldehyde, 3-chlorobenzaldehyde or p-anisaldehyde can be mixed or blended with a dialdehyde or mixture of dialdehydes to control the molecular weight of the prepolymer.

Pyrazine, pyrazole, pyridazine, pyrimidine, pyridine, purines, pteridines, imidazole, triazines, quinoline, and quinoxalines or mixtures thereof containing both a substituent having at least one hydrogen atom attached to a carbon atom which is attached to the ring and an aldehyde substituent can be reacted with itself. For example, suitable pyrazines containing both a substituent having at least one hydrogen atom attached to a carbon atom which is attached to the ring and an aldehyde substituent include 2-methyl-5-pyrazinecarboxaldehyde, 2-methyl-6-pyrazinecarboxaldehyde, 2-methyl-3,5-pyrazinedicarboxaldehyde, 2,3-dimethyl-5-pyrazinecarboxaldehyde and 2,3-dimethyl-5,6-pyrazinedicarboxaldehyde.

Termination agents or compounds containing polymerizable unsaturated groups include ethenyl (vinyl) substituted monoaldehydes and aromatic heterocycles having both vinyl and alkyl groups. Suitable vinyl substituted monoaldehydes include 4-(1-methylethenyl)-1-cyclohexene-1-carboxaldehyde (perillaldehyde); 5-norbornene-2-carboxaldehyde; 3-cyclohexene-1-carboxaldehyde; endobicyclo[3.1.0]hex-2-end-6-carboxaldehyde; arcolein; crotonaldehyde; trans-2-hexenal; 2,4-hexadienal; trans,trans-2,4-heptadienal; trans,trans-2,4-octadienal; trans,trans-2,4-nonadienal; 3,7-dimethyl-2,6-octadienal; 4-ethenylbenzaldhyde; 3,4-diethenylbenzaldehyde; 5-ethenylpyrazine-2-carboxaldehyde; 6-ethenylpyrazine-2-carboxaldehyde; 5-ethenylpyridine-2-carboxaldehyde; 4-(4-ethenylphenyl)-benzaldehyde; 4-(4-ethenylphenoxy)-benzaldehyde; and their mixtures.

Suitable aromatic heterocyclic compounds having both ethenyl (vinyl) and alkyl groups include 3-ethenyl-2-methylpyridine (2-methyl-3-vinylpyridine); 5-ethenyl-2-methylpyridine (2-methyl-5-vinylpyridine); 6-ethenyl-2-methylpyridine (2-methyl-6-vinylpyridine); 2-(buta-1,3-dienyl)-6-methylpyridine; 2-(pent-1-enyl)-6-methylpyridine; 2-(but-1,3-dienyl)-4,6-dimethylpyridine; 2-methyl-4(prop-1-enyl)-pyridine; 2-(6-(4-(1-methylethen-1-yl)cyclohex-1-enyl))-6-methylpyridine; 2-(6-(4-(1-methylethen-1-yl)cyclohex-1-enyl))-4,6-dimethylpyridine; 3,5-diethenyl-2-methylpyridine; 2,5-diethenyl-3,4-dimethylpyridine; 3,5-diethenyl-2,4,6-trimethylpyridine; 3-chloro-5-ethenyl-2,6-dimethylpyridine; 5-ethenyl-6-ethyl-2-methylpyridine; 5-ethenyl-2-methyl-4-propylpyridine; 3-ethenyl-2,6-diethylpyridine; 6-ethenyl-2,4-diethylpyridine; 3-ethenyl-2-methylpyrazine (2-methyl-3-vinylpyrazine); 5-ethenyl-2-methylpyrazine (2-methyl-5-vinylpyrazine); 6-ethenyl-2-methylpyrazine (2-methyl-6-vinylpyrazine); 5-ethenyl-2,6-dimethylpyrazine; 5-ethenyl-2,3,6-trimethylpyrazine; 3,5-diethenyl-2,6-dimethylpyrazine; 5-ethenyl-2-ethyl-6-methylpyrazine; 5-ethenyl-2,6-diethylpyrazine; 2-methyl-5-(1-methylethenyl)pyrazine; 2-(2-ethylbut-1-enyl)-6-methylpyrazine; 2-methyl-6-(2-methylprop-1-enyl)pyrazine; 2-(but-1,3-dienyl)-6-methylpyrazine; 2-(pent-1-enyl)-3,6-diethylpyrazine; 2-(but-1,3-dienyl)-3,6-dimethylpyrazine; 2-methyl-5-(prop-1-enyl)pyrazine; 2-(6-(4-(1-methylethen-1-yl)cyclohex-1enyl))-6-methylpyrazine; 2-(6-(4-(1-methylethen-1-yl)cyclohex-1-enyl))-5,6-dimethylpyrazine; 2-(6-(4-(1-methylethen-1-yl)cyclohex-1-enyl))-3,5,6-trimethylpyrazine; 5-ethenyl-3-methylpyridazine; 4-chloro-5-ethenyl-3-methylpyridazine; 5-ethenyl-3,6-dimethylpyridazine; 4-ethenyl-2,6-dimethylpyrimidine; 6-ethenyl-2-methyl-4-pyrimidinamine; 6-ethenyl-2,8-dimethylpurine; 8-ethenyl-2,6-dimethylpurine; 6-ethenyl-8ethyl-2-methylpurine; 6ethenyl-2-methyl-8-purinamine; 2-ethenyl-6,7- dimethylpteridine; 6-ethenyl-2,4-dimethyl-1,3,5-triazine; 5-ethenyl-3,6-dimethyl-1,2,4-triazine; 5-ethenyl-3-methyl-6-propyl-1,2,4-triazine; 7-ethenyl-2,4,8-trimethylquinoline; 6,7-diethenyl-2,4,8-trimethylquinoline; 6-ethenyl-2,3,8-trimethylquinoxaline; 4-ethenyl-2,5-dimethylimidazole; 4-ethenyl-3,5-dimethylpyrazole and their mixtures.

The vinyl terminated polystyrylpyrazine prepolymers can be prepared by condensing the alkyl substituted pyrazine, aldehyde and ethenyl (vinyl termination agent in a one or two step process. The one step process comprises condensing all three ingredients simultaneously. The two step process comprises (1) condensing the alkyl substituted pyrazine and aldehyde to form polystyrylpyrazine oligomers and then (2) condensing the polystyrylpyrazine oligomers with a vinyl termination agent. These reactions can be carried out neat or in the presence of a solvent. A solvent is preferred. Dehydration conditions are suitably provided by a dehydrating agent and/or a catalyst to activate the methyl groups. In the absence of a vinyl termination agent, the condensation is carried out at a temperature of from about 50° to about 220° C., preferably from 120° to 180° C. for about 1–48 hours (3600–172,800 s), especially 5–9 hours (18,000–32,400 s). In the presence of a vinyl termination agent, the condensation is carried out at a temperature of from 50° to about 140° C., preferably from 80° to 120° C. for about 1–48 hours (3600–172,800 s), preferably from 6 to 24 hours (21,600–86,400 s).

Suitable solvents include acids, amides, ketones, ethers, chlorinated solvents, aromatic heterocycles containing no alkyl substituents and the like. Particularly suitable solvents include, glacial acetic acid, dimethylformamide, N,N-dimethylacetamide, N,N-dimethylformamide, N,N-dimethylmethoxyacetamide, hexamethylphosphotriamide, N-methyl-pyrrolidinone, tetrahydrofuran, pyridine, mixtures thereof and the like.

Suitable catalyst include, for example, acids, Lewis acids, bases or salts. Particularly suitable acids include, for example, sulfuric, hydrochloric or p-toluene-sulfonic acid. Particularly suitable bases include, for example, hydroxides of alkali or alkaline earth metals or of quaternary ammonium. Particularly suitable Lewis acids include, for example, boron trifluoride and the like. Particularly suitable salts include, for example, zinc chloride or aluminum chloride. The use of such catalysts is not indispensable but it reduces the time required for the reaction. The amount is e.g. of from about 0.1 to about 10 mole% with respect to the aromatic dialdehyde. If desirable, larger or lesser quantities can be employed.

Acceleration can occur with certain substances such as methyl iodide, methyl sulfate, benzyl chloride etc., which are capable of forming with the pyrazinic base quaternary ammonium derivatives, such substances being usable in catalytic amounts or higher proportions.

Dehydrating agents such as acetic anhydride, trifluoroacetic anhydride, propionic anhydride and the like can promote the reactions and its action can be sufficient to render superfluous the incorporation of a catalyst. The amount of anhydride used ranges from 1 to 10 moles per mole of vinyl termination agent, preferably 1.1 to 5. The preferred dehydrating medium is a mixture of glacial acetic acid and acetic anhydride. The acetic acid and acetic anhydride can be removed by distillation, solvent extraction, solvent fractionation or by neutralization with a base. Examples of several solvent fractionation methods are described in U.S. Pat. Nos. 4,362,860 and 4,471,107 which are incorporated herein by reference. Suitable bases include sodium hydroxide, ammonia hydroxide and ammonia.

The reactions are usually conducted either under reduced pressure or in an inert atmosphere such as, for example, nitrogen, helium, neon, zenon, argon, mixtures thereof and the like.

The thermosettable prepolymers or resins of the present invention can be cured as is with the application of heat and pressure, or they can be dissolved in a suitable solvent or mixture of solvents and employed to saturate various reinforcing materials so as to prepare composites therefrom through the application of heat and pressure.

Suitable solvents which can be employed for preparing these composites include, for example, ketones, acetates, alcohols, ethers, hydrocarbons and the like. Particularly suitable solvents include, for example, acetone, methylethylketone, ethyl acetate, methylene chloride, trichloroethylene, tetrahydrofuran, chlorobenzene, ethanol, n-propanol, N-methyl-pyrrolidinone, dimethylformamide, dimethylacetamide, nitrobenzene, mixtures thereof and the like.

Suitable reinforcing materials include, for example, glass fibers, aramid fibers, carbon or graphite fibers and the like in any form such as, for example, matt, woven or fibrous form. Any synthetic or natural fiber materials can be employed as the reinforcing material.

The thermosettable propolymers can be used according to various conventional techniques applicable to thermosetting resins. Powdered prepolymers are especially adapted for shaping by pressure-molding, but they can also be dissolved in a solvent or be employed in molten form. They can be used in the preparation of laminates or composites, molded articles, films, coatings and the like.

The thermosettable products of the present invention can be cured by compression molding at a temperature of from about 100° C. to about 350° C. and a pressure up to about 10,000 psig.

The prepolymer is advantageously set by a thermal treatment at a temperature of from about 100° to about 300° C. Finally there is obtained a non-fusible and non-soluble polymer. Said polymer has a good thermal stability.

The vinyl terminated prepolymer can be homopolymerized (blended) in the presence of a N,N'-bis-imide or copolymerized with a N,N'-bis-imide of the formula:

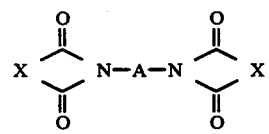

in which X represents a divalent radical containing a carbon-carbon double bond and A is a divalent radical having at least 2 carbon atoms. Preferred N,N'-bis-imides which may be employed include 1,1'-(1,2-ethanediyl)bis-1H-pyrrole-2,5-dione; 1,1'-(1,6-hexanediyl)bis-1H-pyrrole-2,5-dione; 1,1'-(1,4-phenylene)-bis-1H-pyrrole-2,5-dione; 1,1'-(1,3-phenylene)bis-1H-pyrrole-2,5-dione; 1,1'-(methylenedi-4,1-phenylene)bis-1H-pyrrole-2,5-dione (1;1'-(methylenedi-4,1-phenylene)bismaleimide); 1,1'-(oxydi-4,1-phenylene)-bis-1H-pyrrole-2,5-dione; 1,1'-(sulfonyldi-4,1-phenylene)bis-1H-pyrrole-2,5-dione; 1,1'-(methylenedi- 4,1-cyclohexanediyl)bis-1H-pyrrole-2,5-dione; 1,1'-[1,4-phenylenebis(methylene)]bis-1H-pyrrole-2,5-dione; 1,1'-[(1,1-dimethyl-3-methylene-1,3-propanediyl)di-4,1-phenylene]bis-1H-pyrrole-2,5-dione; 1,1'-[(1,3,3-trimethyl-1-propene-1,3-diyl)di-4,1-phenylene]bis-1H-pyrrole-2,5-dione; and Technochemie's H-795 resin. Technochemie's H-795 resin is represented by the formula:

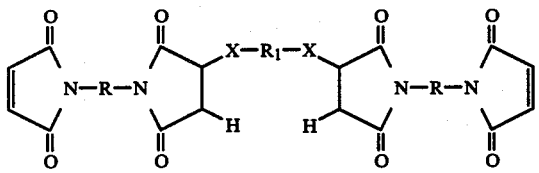

where R is an aromatic ring and X—R₁—X is a Michael addition coupling group. Technochemie's M-751 resin is a "eutectic" mixture of

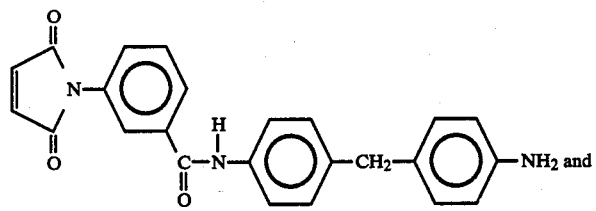

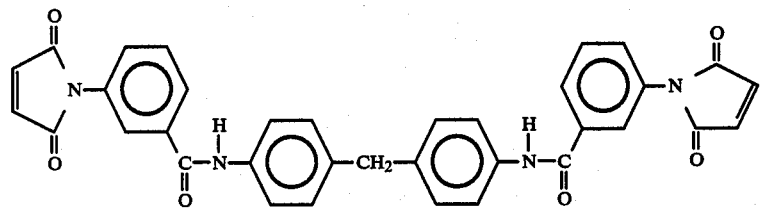

The following examples are illustrative of the present invention, but are not to be construed as to limiting the scope thereof in any manner.

EXAMPLE 1

(Preparation of a Pyrazine Containing a Polymerizable Unsaturated Group)

2,3,5,6-Tetramethylpyrazine (79.96 g, 0.59 mole) and 4-isopropenyl-1-cyclohexene-1-carboxaldehyde (94.61 g, 0.63 mole) were heated with stirring in a 500 ml resin kettle equipped with a dry ice-acetone cold trap, immersion thermometer, mechanical stirrer and nitrogen purge system. Sulfuric acid (2.00 g, 0.0204 mole) was added after complete dissolution which was apparent at 105° C. After 7 hours and 18 minutes (26,280 s) between 105°-190° C., the reactor contents were sampled. 2-(6-(4-(1-methylethen-1-yl)cyclohex-1-enyl))-3,5,6-trimethylpyrazine,

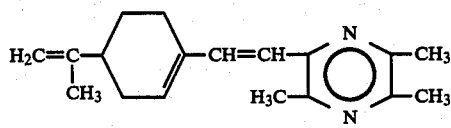

was identified in the reactor sample by electron impact capillary chromatography mass spectrometry. The reactor contents were heated for an additional 7 hours and 35 minutes (27,300 s) between 107°-193° C. The resultant reddish brown colored liquid was subjected to rotary evaporation at 100° C. under full vacuum.

EXAMPLE 2

2,3,5,6-Tetramethylpyrazine (38.2 g, 0.28 mole), terephthaldicarboxaldehyde (57.2 g, 0.43 mole), and acetic acid (51.9 g, 0.86 mole) were weighed into a 500 ml resin kettle equipped with an immersion thermometer, mechanical stirrer, nitrogen gas purge and condenser. After the reactants were stirred and deoxygenated for five minutes (300 s), acetic anhydride (87.2 g, 0.85 mole) was added to the resin kettle. The reactants were heated to 142° C. and allowed to reflux for 4 hours and 2 minutes (14,520 s). The reaction mixture was cooled to 97° C. and the rotary evaporation product from the reaction of 2,3,5,6-tetramethylpyrazine and 4-isopropenyl-1-cyclohexene-1-carboxaldehyde in Example 1 (55.2 g) was added to the resin kettle. The reactants were heated between 107°-114° C. for an additional 7 hours and 22 minutes (26,520 s). While the resultant red orange colored liquid was cooling, the reactor contents were neutralized with an aqueous solution of 9.6 wt/wt% of sodium hydroxide (793 g). The sodium hydroxide solution was decanted, deionized water (761 g) added to the orange prepolymer, the resultant contents stirred for 35 minutes (2100 s) and the water decanted. The prepolymer was washed twice more with water. The prepolymer was dissolved in tetrahydrofuran and filtered. The filtrant was discarded, while the filtrate was rotary evaporated at 100° C. under full vacuum. The resultant red-orange viscous liquid was dried between 90°-98° C. under full vacuum for 14 hours and 15 minutes (51,300 s). The resulting soft red orange solid was analyzed by proton ('H) nuclear magnetic resonance (NMR) spectroscopy to verify the structure of the prepolymer. The terminal isopropenyl (H₂C=C<) proton, the cyclohexene vinyl (—CH=C<) proton, and the aromatic and internal vinyl (—CH=CH—) protons were observed absorbing at 4.1-4.3, 6.4, and between 6.9-7.6 ppm, respectively. Two and five tenths percent of the total protons were terminal isopropenyl (H₂C=C<) protons. The experimentally determined proton distribution of the isopropenyl terminated prepolymer is consistent with n=2,

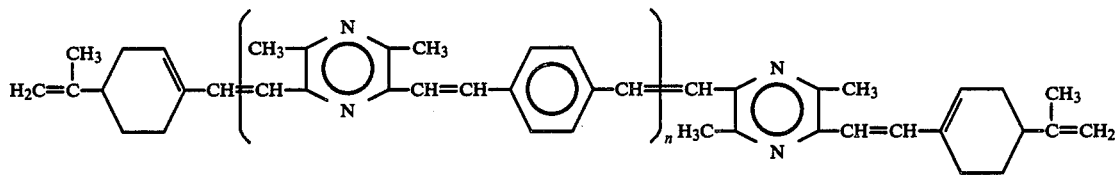

EXAMPLE 3

The red orange isopropenyl terminated polystyrylpyrazine prepolymer prepared in Example 2 was oven cured between 95°–155° C. under full vacuum for 16 hours and 40 minutes (60,000 s). Gel permeation chromatography based upon polystyrene standards indicated the weight average molecular weight of the isopropenyl terminated prepolymer was 623. The prepolymer was oven cured an additional 3 hours and 40 minutes (13,200 s) between 155°–263° C. The resulting red orange solid was crushed with a mortar and pestle and then sieved with a U.S.A. Standard Testing Sieve No. 40 to give a fine red orange powder. The isopropenyl terminated prepolymer softened at 155° C. The red orange isopropenyl terminated prepolymer was compression molded between 192°–198° C. and 3550–4000 psi (24,477–27,580 kPa) for 1 hour (3600 s) and between 257°–265° C. and 3700–3800 psi (25,512–26,201 kPa) for another hour (3600 s) with a Carver Laboratory press, employing a silicone mold release agent. Thermogravimetric analysis of the cured black polymer in nitrogen showed 5% weight loss at 420° C. and 50.1% weight loss at 950° C. In air, the polymer lost 5% weight at 420° C. Dynamic mechanical analyses was performed between −160° C. to 400° C. in the torsional rectangular mode with a oscillatory frequency of 1 hertz and 0.05% strain. The polymer exhibited a gamma transition ($T_\gamma$) temperature at −120° C. and storage modulus (G') of $1.779 \times 10^{10}$ dynes/cm$^2$ at 25° C.

EXAMPLE 4

The red orange isopropenyl terminated polystyrylpyrazine prepolymer prepared in Example 2 was oven cured between 115°–187° C. under full vacuum for 2 hours and 58 minutes (10,680 s) and then between 79°–265° C. under full vacuum for 16 hours and 19 minutes (58,740 s). The isopropenyl terminated polystyrylpyrazine prepolymer softened between 157°–180° C.

1,1'-(Methylenedi-4,1-phenylene)bismaleimide was oven cured under full vacuum between 186°–219° C. for 17 minutes (1020 s). The oven cured 1,1'-(methylenedi-4,1-phenylene)bismaleimide softened at 158° C. This 1,1'-(methylenedi-4,1-phenylene)bismaleimide (13 g) and the oven cured isopropenyl terminated polystyrylpyrazine prepolymer (13 g) were mixed to give a brown powder. This powder was compression molded between 187°–195° C. and 6980–7350 psi (48,127–50,678 kPa) for one hour and 2 minutes (3720 s) and between 262°–264° C. and 7020–7050 psi (48,403–48,610 kPa) for another hour (3600 s) with a Carver Laboratory press as described in Example 3. Thermogravimetric analysis of the cured black polymer in nitrogen showed 5% weight loss at 440° C. and 51.5% weight loss at 950° C. In air, the polymer lost 5% weight at 452° C.

EXAMPLE 5

2,3,5,6-Tetramethylpyrazine (45.5 g, 0.33 mole), terephthaldicarboxaldehyde (67.4 g, 0.50 mole) and acetic acid (61.5 g, 1.02 mole) were weighed into a 1 liter resin kettle equipped with an immersion thermometer, mechanical stirrer, nitrogen gas purge and condenser. After the reactants were deoxygenated by stirring for five minutes (300 s) in a nitrogen atmosphere, acetic anhydride (103.6 g, 1.01 mole) was added to the resin kettle. The reactants were heated to 143° C. and allowed to reflux for 6 hours and 53 minutes (24,780 s). Then the reaction mixture was cooled to below 100° C. and 2,3,5,6-tetramethylpyrazine (68.7 g, 0.50 mole), and 4-isopropenyl-1-cyclohexene-1-carboxaldehyde (73.0 g, 0.49 mole) were added to the resin kettle. The reactor contents were heated between 132°–136° C. for an additional 23 hours and 20 minutes (84,000 s). As the resultant red orange colored liquid was cooled to room temperature, the stirring reactor contents were neutralized with an aqueous solution of 9.7 wt/wt% of sodium hydroxide (924 g). The sodium hydroxide solution was decanted, deionized water (1056 g) added to the burgundy colored isopropenyl terminated polystyrylpyrazine prepolymer, the resultant contents stirred for 1 hour 54 minutes (6,840 s) and the water decanted. The isopropenyl terminated prepolymer was washed twice more with water (2400 g). The burgundy solid was dried in an oven under full vacuum between 123°–135° C. for 1 hour and 44 minutes (6,240) and then between 172°–250° C. for 3 hours and 13 minutes (11,580 s). After cooling to room temperature, the prepolymer was sieved with a U.S.A. Standard Testing Sieve No. 40. Gel permeation chromatography based upon polystyrene standards indicated the weight average molecular weight of the isopropenyl terminated polystyrylpyrazine prepolymer was 2710. The isopropenyl terminated prepolymer softened between 153°–172° C. In a differential scanning calorimetry analysis, the burgundy prepolymer sealed in a glass ampule exhibited an exotherm of 12.5 joules/gram that started at 100° C., peaked at 146° C. and ended at 182° C. followed by a secondary exotherm of 166 joules/gram that started at 230° C., peaked at 347° C. and ended at 396° C.

EXAMPLE 6

The isopropenyl terminated polystyrylpyrazine prepolymer (51 g) described in Example 5 was dissolved in tetrahydrofuran (73 g) by heating to a slight boil on a hot plate. The tetrahydrofuran solution of isopropenyl terminated prepolymer was brushed onto a 14"×14" (35.6×35.6 cm) woven graphite fiber mat (Hercules AP193 dry cloth) clamped to a frame. The graphite fiber mat preimpregnate was allowed to dry overnight at room temperature. Then it was dried in an oven under full vacuum between 122°–155° C. for 29 minutes (1,740 s). The red orange prepolymer scraped off the graphite fiber mat preimpregnate soften between 238°–254° C. Nine 4"×4" (10.1×10.1 cm) sections were cut from the graphite fiber mat preimpregnate, layed up on top of one another and then compression molded between 240°–248° C. and 550–2000 psi (3,792–13,790 kPa) for 1 hour (3600 s) and then between 246°–279° C. and 580–700 psi (3,999–4,827 kPa) for 2 hours (7200 s) with a Carver Laboratory press. The finished composite had thoroughly fused giving a brown and flexible sample after trimming. Thermogravimetric analysis of the graphite composite in nitrogen showed 5% weight loss at 460° C. and 19.5% weight loss at 950° C. The composite lost 5% weight at 386° C. and 70% weight at 700° C. in air. Dynamic mechanical analyses showed no glass transition temperature up to 400° C., a gamma transition ($T_\gamma$) temperature at −113° C. and storage modulus (G') of $4.027 \times 10^{10}$ dynes/cm$^2$ at 25° C. Modulus retention at 200° and 300° C. with respect to the storage modulus at 25° C. was 73 and 64%, respectively.

EXAMPLE 7

Technochemie Compimide 795 (a bismaleimide) was dried in an oven under full vacuum between 100°–137° C. for 1 hour and 8 minutes (4,080 s). The dried Technochemie Compimide 795 (3.1 g) and the isopropenyl terminated polystyrylpyrazine prepolymer (3.1 g) described in Example 5 were mixed and crushed with mortar and pestle giving an orange brown powder. In a differential scanning calorimetry analysis, the orange brown powder sealed in a glass ampule exhibited an exotherm of 139 joules/gram that started at 100° C., peaked at 204° C. and ended at 262° C. The dried Technochemie Compimide 795 alone exhibited an exotherm of 249 joules/gram that started at 120° C., peaked at 249° C. and ended at 323° C. This differential scanning calorimetry experiment demonstrates that the isopropenyl terminated polystyrylpyrazine prepolymer lowered the cure temperature of the Technochemie Compimide 795 by 45° C.

The mixture of the isopropenyl terminated polystyrylpyrazine and Technochemie Compimide 795 was cured in an oven under full vacuum between 106°–158° C. for 57 minutes (3,420 s). After cooling to room temperature, the partially cured copolymer was a burgundy colored solid. It was crushed with a mortar and pestle to given an orange brown powder that softens at 177° C. This powder was compression molded between 187°–201° C. and 4700–5050 psi (32,407–34,820 kPa) for 1 hour (3600 s) and between 252°–264° C. and 4700–4950 psi (32,407–34,130 kPa) for another hour (3600 s) with a Carver Laboratory press as described in Example 3. Thermogravimetric analysis of cured copolymer in nitrogen showed 5% weight loss at 420° C. and 51.2% weight loss at 950° C. In air, the copolymer lost 5% weight at 405° C. Dynamic mechanical analyses showed a gamma transition ($T_\gamma$) temperature at −106° C. and storage modulus (G') of $2.22 \times 10^{10}$ dynes/cm$^2$ at 25° C.

EXAMPLE 8

2,3,5,6-Tetramethylpyrazine (136.4 g, 1.00 mole), terephthaldicarboxaldehyde (203.7 g, 1.52 moles) and acetic acid (184.27 g, 3.07 mole) were weighed into a 2-liter resin kettle equipped with an immersion thermometer, mechanical stirrer, nitrogen gas purge system and condenser. After the reactants were deoxygenated by stirring for five minutes (300 s) in a nitrogen atmosphere, acetic anhydride (307.4 g, 3.01 moles) was added to the reactor. The reactants were heated to 142° C. and allowed to reflux for 5 hours (18,000 s). After the reaction mixture was cooled to 98° C., 2-methyl-5-vinylpyridine (182.97 g, 1.54 mole) was added to the resin kettle. The reactor contents were heated between 93°–123° C. for an additional 9 hours and 14 minutes (33,240 s). As the burgundy colored liquid was cooling to room temperature, the reactor contents were neutralized with an aqueous solution of 9.99 wt/wt% sodium hydroxide (1701 g). The sodium hydroxide solution was decanted, deionized water (855 g) was added to the burgundy vinyl terminated prepolymer and the water decanted. Again water (1094 g) was added to the burgundy prepolymer and this mixture stirred for 51 minutes (3,060 s), the water was decanted, the prepolymer washed with water (876 g), the water was decanted, water (1091 g) added to the prepolymer and the mixture stirred for 2 hours (7200 s) and the water decanted giving a burgundy viscous liquid. Gel permeation chromatography indicated the weight average molecular weight of the 2-methyl-5-vinylpyridine terminated prepolymer was 554.

EXAMPLE 9

The burgundy viscous liquid from Example 8 was dried in an oven under full vacuum between 80°–122° C. for 5 hours and 29 minutes (19,740 s) and oven cured under full vacuum between 118°–200° C. for 2 hours and 58 minutes (10,680 s). The resultant solid was crushed with a mortar and pestle and then sieved with a U.S.A. Standard Testing Sieve No. 40 to give a fine burgundy powder. Gel permeation chromatography indicated the weight average molecular weight of the 2-methyl-5-vinylpyridine terminated prepolymer was 1602. The burgundy powder softened between 133°–163° C. The burgundy 2-methyl-5-vinylpyridine terminated prepolymer was compression molded between 170°–193° C. and 4200–4500 psi (28,959–31,028 kPa) for 1 hour (3600 s) and then between 220°–254° C. and 4300–4500 psi (29,649–31,028 kPa) for 1 hour 33 minutes (5,580 s) with a Carver Laboratory press, employing a silicone mold release agent. Thermogravimetric analysis of the cured polymer in nitrogen showed 5% weight loss at 390° C. and 41.0% weight loss at 950° C. In air, the polymer lost 5% weight at 400° C. Dynamic mechanical analyses showed no glass transition temperature up to 400° C., a gamma transition ($T_\gamma$) temperature at −104° C. and storage modulus (G') of $7.911 \times 10^9$ dynes/cm$^2$ at 25° C.

EXAMPLE 10

The burgundy viscous liquid from Example 8 was dried in an oven under full vacuum between 75°–127° C. for 8 hours and 31 minutes (30,660 s). The resultant solid was crushed with mortar and pestle to give a fine burgundy powder. Gel permeation chromatography indicated the weight average molecular weight of the 2-methyl-5-vinylpyridine terminated prepolymer was 1657. In a differential scanning calorimetry analysis, the burgundy prepolymer exhibited an exotherm of 59.8 joules/gram that started at 144° C., peaked at 228° C. and ended at 260° C. followed by a secondary exotherm that peaked at 348° C. The burgundy 2-methyl-5-vinylpyridine terminated polystyrylpyrazine melted between 68°–105° C. The 2-methyl-5-vinylpyridine terminated polystyrylpyrazine prepolymer (50.9 g) was solubilized in tetrahydrofuran (45 g) by heating to a slight boil on a hot plate. The tetrahydrofuran solution of 2-methyl-5- vinylpyridine terminated polystyrylpyrazine prepolymer was brushed onto a 14"×14" (35.6×35.6 cm) woven graphite fiber mat (Hercules AP193 dry cloth) clamped to a frame. The graphite fiber mat preimpregnate was allowed to dry overnight at room temperature. Then it was dried in an oven under full vacuum between 120°-155° C. for 40 minutes (2400 s) and between 167°-181° C. for 21 minutes (1260 s). The burgundy prepolymer scraped off the graphite fiber mat preimpregnate soften between 131°-195° C. Nine 4"×4" (10.1×10.1 cm) sections were cut from the graphite fiber mat preimpregnate, layed up on top of one another and then compression molded between 187°-235° C. and 1780-2580 psi (12,273-17,789 kPa) for 1 hour (3600 s) and then between 231°-263° C. and 1800-1850 psi (12,411-12,756 kPa) for 2 hours (7200 s) with a Carver Laboratory press. The finished composite had thoroughly fused giving a dark brown, flexible sample after trimming. Thermogravimetric analysis of the graphite composite in nitrogen showed 5% weight loss at 447° C. and 28.2% weight loss at 950° C. The composite lost 5% weight at 415° C. in air. Dynamic mechanical analysis showed no glass transition temperature up to 400° C., a gamma transition ($T_\gamma$) temperature at −105° C. and storage modulus (G') of $4.136\times10^{10}$ dynes/cm$^2$ at 25° C. Modulus retention at 200° and 300° C. with respect to the storage modulus at 25° C. was 81 and 72%, respectively.

EXAMPLE 11

Technochemie Compimide 795 was dried in an oven under full vacuum between 100°-137° C. for 1 hour and 8 minutes (4,080 s). The burgundy 2-methyl-5-vinylpyridine terminated polystyrylpyrazine prepolymer from Example 8 was dried in an oven under full vacuum between 87°-127° C. for 7 hours and 7 minutes (25,620 s). Gel permeation chromatography indicated the weight average molecular weight of the burgundy prepolymer was 1220. The dried Technochemie Compimide 795 (3.74 g) and the dried 2-methyl-5-vinylpyridine terminated polystyrylpyrazine prepolymer (3.75 g) were mixed and crushed with mortar and pestle giving an orange brown powder. In a differential scanning calorimetry analysis, the orange brown powder exhibited an exotherm of 197 joules/gram that started at 100° C., peaked at 179° C. and ended at 270° C. The dried Technochemie Compimide 795 alone exhibited an exotherm of 249 joules/gram that started at 120° C., peaked at 249° C. and ended at 332° C. This differential scanning calorimetry experiment demonstrates that the 2-methyl-5-vinylpyridine terminated polystyrylpyrazine prepolymer lowered the cure temperature of the Technochemie Compimide 795 by 70° C.

The mixture of dried Technochemie Compimide 795 and dried 2-methyl-5-vinylpyridine terminated polystyrylpyrazine prepolymer was cured in an oven under full vacuum between 106°-155° C. for 24 minutes (1440 s) and then between 147°-158° C. for 33 minutes (1980 s). After cooling to room temperature, the partially cured copolymer was a burgundy colored solid. The solid as crushed with a mortar and pestle to give a red orange powder that softened between 180°-200° C. This powder was compression molded between 197°-205° C. and between 5020-5300 psi (34,613-36,544 kPa) for 1 hour and 6 minutes (3960 s) and then between 242°-264° C. and 5060-5100 psi (34,889-35,165 kPa) for 53 minutes (3180 s) with a Carver Laboratory press. Thermogravimetric analysis of cured copolymer in nitrogen showed 5% weight loss at 375° C. and 48% weight loss at 950° C. In air, the copolymer lost 5% weight at 370° C. Dynamic mechanical analyses showed no glass transition temperature up to 390° C., a gamma transition ($T_\gamma$) temperature at −107° C. and storage modulus (G') of $1.055\times10^{10}$ dynes/cm$^2$ at 25° C.

EXAMPLE 12

2,3,4,6-Tetramethylpyrazine (136 g, 1.0 moles), terephthaldicarboxaldehyde (201 g, 1.5 moles) and acetic acid (180 g, 3 moles) were stirred in a 2-liter resin kettle equipped with a mechanical stirrer, thermometer, nitrogen gas inlet and condenser. After deoxygenation, acetic anhydride (306 g, 2.97 moles) was added to the reactor. The reactants were heated to 140° C. and allowed to reflux for 6 hours and 14 minutes (29,640 s). The reaction mixture was cooled to 100° C. and 2-methyl-5-vinylpyridine (179 g, 1.5 moles) was added to the reactor. The reactants were heated to 120° C. and allowed to reflux for 8 hours and 14 minutes (29,640 s). On cooling to room temperature, the reactor product was a red-burgundy viscous liquid.

The red-burgundy product (187 g) was transferred to a 1-liter reactor, stirred and an 8% aqueous solution of sodium hydroxide was added until the product was neutralized. The sodium hydroxide solution was decanted, water added to the prepolymer, contents were stirred for an hour (3600 s) and the water decanted. The prepolymer was twice more washed with water. The prepolymer was dried by using vacuum filtration and 2-3 hours (7200-10,800 s) at 90° C. under full vacuum in an oven to give a red-burgundy solid. The red-burgundy solid was ground with mortar and pestle to give a red-burgundy powder that melted at 100° C. The infrared spectrum of the powder showed a band at 970 cm$^{-1}$ which indicates the presence of trans unsaturation and a band at 910 cm$^{-1}$ which is characteristic of =CH$_2$ wagging frequency of a vinyl group (R—CH=CH$_2$). The red-burgundy 2-methyl-5-vinylpyridine terminated polystyrylpyrazine prepolymer was sieved and then compression molded between 240°-275° C. and 6100 psi (42,060 kPa) for 2 hours (7200 s) with a Carver Laboratory press, employing a silicone mold release agent. Thermogravimetric analysis of the cured polymer in nitrogen showed 5% weight loss at 422° C. and 42% weight loss at 950° C. In air, the polymer lost 5% weight at 397° C. Dynamic mechanical analyses showed no glass transition temperature up to 400° C., a gamma transition ($T_\gamma$) temperature at −100° C. and storage modulus (G') of $1.220\times10^{10}$ dynes/cm$^2$ at 25° C. The compression molded polymer was post cured for 15 hours between 255°-265° C. Thermogravimetric analysis in nitrogen showed 5% weight loss at 455° C. and 39% weight loss at 950° C. In air, the polymer lost 5% weight at 405° C.

EXAMPLE 13

1,1'-(Methylenedi-4,1-phenylene)bismaleimide was oven cured under full vacuum at 180° C. and sieved with a U.S.A. Standard Testing Sieve No. 40. The resulting maleimide prepolymer softened between 200°-250° C. The maleimide prepolymer (10 g) and the sieved red-burgundy 2-methyl5-vinylpyridine terminated polystyrylpyrazine prepolymer (10 g) described in Example 12 were mixed to give a brown colored powder. This powder was compression molded between 235°-292° C. and between 5950-6100 psi (41,025–42,060 kPa) for 2 hours (7200 s) with Carver Laboratory press as described in Example 3. Thermogravimetric analysis of the cured black polymer in nitrogen showed 5% weight loss at 386° C. and 46.5% weight loss at 950° C. In air, the polymer lost 5% weight at 400° C. and 64% weight loss at 700° C. Dynamic mechanical analyses showed a gamma transition ($T_\gamma$) temperature at $-100°$ C. and storage modulus (G') of $1.433 \times 10^{10}$ dynes/cm$^2$ at 25° C.

I claim:

1. A thermosettable product which results from reacting at a temperature of from about 50° C. to about 220° C.

(A) a pyrazine compound containing at least two substituent groups which have at least one hydrogen atom attached to a carbon atom which is attached to the ring or mixture of such pyrazines;

(B) at least one material having at least two aldehyde groups; and (C) at least one of (1) a nitrogen containing aromatic heterocyclic compound containing at least one hydrogen atom attached to a carbon atom attached to the ring and a polymerizable unsaturated group;

(2) an aldehyde containing at least one polymerizable unsaturated group; or (3) a combination thereof;

and wherein components (A), (B) and (C) are employed in quantities which provide a molar ratio of components (B):(C):(A) of from about 0.25:0.25:1 to about 4:4:1.

2. A product of claim 1 wherein component (A) has two substituent methyl groups; component (B) has two aromatic aldehyde groups; and components (A), (B) and (C) are employed in quantities which provide a molar ratio of components (B):(C):(A) of from about 0.5:0.5:1 to about 1.5:1.5:1.

3. A product of claim 1 wherein component (A) has three substituent methyl groups; component (B) has two aromatic aldehyde groups; and components (A), (B) and (C) are employed in quantities which provide a molar ratio of components (B):(C):(A) of from about 0.5:0.5:1 to about 1.5:1.5:1.

4. A product of claim 1 wherein component (A) has four substituent methyl groups; component (B) has two aromatic aldehyde groups; and components (A), (B) and (C) are employed in quantities which provide a molar ratio of components (B):(C):(A) of from about 0.5:0.5:1 to about 1.5:1.5:1.

5. A product of claim 1 wherein component (A) is 2,5-dimethylpyrazine, 2,3,5-trimethylpyrazine, 2,3,5,6-tetramethylpyrazine or a combination thereof; component (B) is terephthaldicarboxaldehyde; and component (C) is 4-isopropenyl-1-cyclohexene-1-carboxaldehyde, the reaction product of 4-isopropenyl-1-cyclohexene-1-carboxaldehyde and 2,3,5,6-tetramethylpyrazine, 2-methyl-5-vinylpyridine or a combination thereof.

6. A product of claim 2 wherein component (A) is 2,5-dimethylpyrazine; component (B) is terephthaldicarboxaldehyde; and component (C) is 4-isopropenyl-1-cyclohexene-1-carboxaldehyde, the reaction product of 4-isopropenyl-1-cyclohexene-1-carboxaldehyde and 2,3,5,6-tetramethylpyrazine, 2-methyl-5-vinylpyridine or a combination thereof.

7. A product of claim 3 wherein component (A) is 2,3,5-trimethylpyrazine; component (B) is terephthaldicarboxaldehyde; and component (C) is 4-isopropenyl-1-cyclohexene-1-carboxaldehyde, the reaction product of 4-isopropenyl-1-cyclohexene-1-carboxaldehyde with 2,3,5,6-tetramethylpyrazine, 2-methyl-5-vinylpyridine or a combination thereof.

8. A product of claim 4 wherein component (A) is 2,3,5,6-tetramethylpyrazine; component (B) is terephthaldicarboxaldehyde; and component (C) is 4-isopropenyl-1-cyclohexene-1-carboxaldehyde, the reaction product of 4-isopropenyl-1-cyclohexene-1-carboxaldehyde with 2,3,5,6-tetramethylpyrazine, 2-methyl-5-vinylpyridine or a combination thereof.

9. A product of claim 1 wherein component (A) has two substituent methyl groups; component (B) is a mixture of at least one material having at least two aromatic aldehyde groups and at least one material having only one aromatic aldehyde group; and components (A), (B) and (C) are employed in quantities which provide a molar ratio of components (B):(C):(A) of from about 0.5:0.5:1 to about 1.5:1.5:1.

10. A product of claim 1 wherein component (A) has three substituent methyl groups; component (B) is a mixture of at least one material having at least two aromatic aldehyde groups and at least one material having only one aromatic aldehyde group; and components (A), (B) and (C) are employed in quantities which provide a molar ratio of components (B):(C):(A) of from about 0.5:0.5:1 to about 1.5:1.5:1.

11. A product of claim 1 wherein component (A) has four substituent methyl groups; component (B) is a mixture of at least one material having at least two aromatic aldehye groups and at least one material having only one aromatic aldehyde group; and components (A), (B) and (C) are employed in quantities which provide a molar ratio of components (B):(C):(A) of from about 0.5:0.5:1 to about 1.5:1.5:1.

12. A product of claim 1 wherein component (A) is 2,5-dimethylpyrazine, 2,3,5-trimethylpyrazine, 2,3,5,6-tetramethylpyrazine or a combination thereof; component (B) is a mixture of terephthaldicarboxaldehyde and benzaldehyde; and component (C) is 4-isopropenyl-1-cyclohexene-1-carboxaldehyde, the reaction product of 4-isopropenyl-1-cyclohexene-1-carboxaldehyde with 2,3,5,6-tetramethylpyrazine, 2-methyl-5-vinylpyridine or a combination thereof.

13. A product of claim 9 wherein component (A) is 2,5-dimethylpyrazine; component (B) is is a mixture of terephthaldicarboxaldehyde and benzaldehyde; and component (C) is 4-isopropenyl-1-cyclohexene-1-carboxaldehyde, the reaction product of 4-isopropenyl-1-cyclohexene-1-carboxaldehyde with 2,3,5,6-tetramethylpyrazine, 2-methyl-5-vinylpyridine or a combination thereof.

14. A product of claim 10 wherein component (A) is 2,3,5-trimethylpyrazine; component (B) is a mixture of terephthaldicarboxaldehyde and benzaldehyde; and component (C) is 4-isopropenyl-1-cyclohexene-1-carboxaldehyde, the reaction product of 4-isopropenyl-1-cyclohexene-1-carboxaldehyde with 2,3,5,6-tetramethylpyrazine, 2-methyl-5-vinylpyridine or a combination thereof.

15. A product of claim 11 wherein component (A) is 2,3,5,6-tetramethylpyrazine; component (B) is a mixture of terephthaldicarboxaldehyde and benzaldehyde; and component (C) is 4-isopropenyl-1-cyclohexene-1-carboxaldehyde, the reaction product of 4-isopropenyl-1-cyclohexene-1-carboxaldehyde with 2,3,5,6-tetramethylpyrazine, 2-methyl-5-vinylpyrazine, or a combination thereof.

16. A product resulting from subjecting a composition containing a product of claims 1, 2, 3, 4, 5, 6, 7, 8, 9, 10, 11, 12, 13, 14 or 15 to conditions sufficient to effect curing to a thermoset condition.

17. A product of claim 16 wherein said curing is effected by compression molding at a temperature of from about 100° C. to about 350° C. and a pressure up to about 10,000 psig.

18. A product of claim 16 wherein said composition contains a reinforcing material.

19. A product of claim 17 wherein said composition contains a reinforcing material.

20. A thermosettable product which results from reacting at a temperature of from about 50° C. to about 220° C. (A) a pyrazole, imidazole, pyridazine, pyrimidine, purine, pteridine, triazine, quinoline or quinoxaline compound or a mixture of any two or more of such compounds containing at least one substituent group which has a hydrogen atom attached to a carbon atom which is attached to the ring with the proviso that at least one of such pyrazole, imidazole, pyridazine, pyrimidine, purine, pteridine, triazine, quinoline or quinoxaline compounds has at least two substituent groups which have a hydrogen atom attached to a carbon atom which is attached to the ring; (B) at least one of (1) at least one material having at least two aldehyde groups or (2) at least one aldehyde having only one aldehyde group; and (C) at least one of (1) a nitrogen containing aromatic heterocyclic compound containing at least one hydrogen atom attached to a carbon atom attached to the ring and a polymerizable unsaturated group; (2) an aldehyde containing at least one polymerizable unsaturated group or (3) a combination thereof; and wherein components (A), (B) and (C) are employed in quantities which provide a molar ratio of components (B):(C):(A) of from about 0.25:0.25:1 to about 4:4:1.

21. A thermosettable product of claim 20 wherein the molar ratio of components (B):(C):(A) is from about 0.5:0.5:1 to about 1.5:1.5:1.

22. A product resulting from subjecting a composition containing a product of claims 20 or 21 to conditions sufficient to effect curing to a thermoset condition.

23. A product of claim 22 wherein said composition contains a reinforcing material.

24. A product of claim 22 wherein said curing is effected by compression molding at a temperature of from about 100° C. to about 350° C. and a pressure of up to about 10,000 psig.

25. A product of claim 24 wherein said composition contains a reinforcing material.

26. A thermosettable product resulting from reacting at a temperature of from about 50° C. to about 220° C. (A) a mixture of (1) at least one pyrazine compound having at least one substituent group which has a hydrogen atom attached to a carbon atom which is attached to the ring and (2) at least one of pyrazole, imidazole, pyridazine, pyrimidine, purine, pteridine, triazine, quinoline or quinoxaline compounds having at least two substituent groups which have a hydrogen atom attached to a carbon atom which is attached to the ring; (B) at least one of (1) at least one material having at least two aldehyde groups or (2) at least one aldehyde having only one aldehyde group; and (C) at least one of (1) a nitrogen containing aromatic heterocyclic compound containing at least one hydrogen atom attached to a carbon atom attached to the ring and a polymerizable unsaturated group; (2) an aldehyde containing at least one polymerizable unsaturated group or (3) a combination thereof; and wherein components (A), (B) and (C) are employed in quantities which provide a molar ratio of components (B):(C):(A) of from about 0.25:0.25:1 to about 4:4:1.

27. A thermosettable product of claim 26 wherein the mole ratio of (B):(B):(A) is from about 0.5:0.5:1 to about 1.5:1.5:1.

28. A product resulting from subjecting a composition containing a product of claims 26 or 27 to conditions sufficient to effect curing thereof to a thermoset product.

29. A product of claim 28 which contains a reinforcing material.

30. A thermosettable product which results from reacting at a temperature of from about 50° C. to about 220° C. (A) a mixture of pyrazine and pyridine each having at least one substituent group which has a hydrogen atom attached to a carbon atom which is attached to the ring to act as a chain terminator, with the proviso that the majority of such pyrazine or pyridine compounds have at least two substituent groups which have a hydrogen atom attached to a carbon atom which is attached to the ring with (B) at least one of (1) at least one material having at least two aldehyde groups or (2) a mixture of (a) at least one aldehyde having at least two aldehyde groups and (b) at least one aldehyde having only one aldehyde group; and (C) at least one of (1) a nitrogen containing aromatic heterocyclic compound containing at least one hydrogen atom attached to a carbon atom attached to the ring and a polymerizable unsaturated group; (2) an aldehyde containing at least one polymerizable unsaturated group or (3) a combination thereof; and wherein components (A), (B) and (C) are employed in quantities which provide a molar ratio of components (B):(C):(A) of from about 0.25:0.25:1 to about 4:4:1.

31. A thermosettable compound of claim 30 wherein the mole ratio of (B):(C):(A) is from about 0.5:0.5:1 to about 1.5:1.5:1.

32. A product resulting from subjecting a composition containing a product of claims 30 or 31 to conditions sufficient to effect curing thereof to a thermoset product.

33. A product of claim 32 which contains a reinforcing material.

34. A product of claim 32 wherein said curing is effected by compression molding at a temperature of from about 100° C. to about 350° C. and a pressure of up to about 10,000 psig.

35. A product of claim 34 wherein said composition contains a reinforcing material.

* * * * *